(12) United States Patent
Son et al.

(10) Patent No.: US 8,714,838 B2
(45) Date of Patent: May 6, 2014

(54) OPTICAL SUBASSEMBLY FOR PASSIVE ALIGNMENT AND METHOD OF ALIGNING THE SAME

(75) Inventors: Yung Sung Son, Fremont, CA (US); Sang-Shin Lee, Seoul (KR); Hak-Soon Lee, Pocheon-si (KR); Gyosun Hwang, Fremont, CA (US)

(73) Assignee: Unive Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/525,137

(22) Filed: Jun. 15, 2012

(65) Prior Publication Data
US 2013/0336619 A1 Dec. 19, 2013

(51) Int. Cl.
*G02B 6/36* (2006.01)
*G02B 6/42* (2006.01)

(52) U.S. Cl.
USPC .............................................. 385/89; 385/93

(58) Field of Classification Search
USPC ....................................................... 385/89, 93
See application file for complete search history.

(56) References Cited

U.S. PATENT DOCUMENTS

| | | | | | |
|---|---|---|---|---|---|
| 5,257,336 | A | * | 10/1993 | Dautartas | 385/93 |
| 5,259,054 | A | * | 11/1993 | Benzoni et al. | 385/89 |
| 7,338,217 | B2 | * | 3/2008 | Morimoto et al. | 385/88 |
| 7,720,337 | B2 | * | 5/2010 | Lu et al. | 385/52 |
| 8,113,725 | B2 | * | 2/2012 | Tagami | 385/92 |
| 2005/0185900 | A1 | * | 8/2005 | Farr | 385/93 |
| 2011/0222823 | A1 | * | 9/2011 | Pitwon | 385/93 |
| 2013/0156386 | A1 | * | 6/2013 | Miller | 385/93 |

* cited by examiner

*Primary Examiner* — Omar Rojas
(74) *Attorney, Agent, or Firm* — Arent Fox LLP

(57) ABSTRACT

A subassembly for passive optical alignment includes a substrate, an alignment device on the substrate having a plurality of alignment holes, and an optical element aligned on the substrate with the alignment holes. A first lens device including a first lens on the alignment device aligns the first lens with the optical element to collimate light emitted from the optical element. A second lens device including a second lens collects the light from the first lens. A receptacle has a ferrule alignment hole penetrating the receptacle. A side of the receptacle is assembled on the second lens device to align the ferrule alignment hole with the second lens. The receptacle is assembled on the alignment device to align the second lens with the first lens. The ferrule alignment hole extends to a connector insertion hole formed on an opposite side of the receptacle that secures an external optical connector.

13 Claims, 15 Drawing Sheets

OPTICAL SUBASSEMBLY FOR PASSIVE ALIGNMENT AND METHOD OF ALIGNING THE SAME

TECHNICAL FIELD

The present invention relates to an optical subassembly, more particularly to an optical subassembly which enables passive alignment of parts by using an alignment reference device arranged on a substrate and which implements the passive alignment with high reliability by utilizing collimating optics.

BACKGROUND ART

An increased need for information exchange at high speeds and in large quantities has led to the development of optical communication technology, by which transmission speeds have passed beyond the level of gigabits per second to terabits per second. With such developments in optical communication technology, it is now possible to establish an optical communication environment within the home, to utilize optical communication in everyday activities.

Low-cost optical transceivers are being manufactured, to meet the demands for optically communicating transceivers at home and in the office. An optical transceiver module is composed of an optical subassembly, electronic circuits for generating and processing electric signals, and the like, and generally has standardized dimensions for its size and input/output terminals.

Thus, in an optical transceiver, the optical subassembly plays the most crucial role and ultimately determines the cost of the optical transceiver. As the optical subassembly performs alignment with the optical fibers, it requires extremely high precision in its structure. In the related art, the light-emitting and light-receiving elements were optically coupled and secured by a method of active alignment, which utilizes a high-precision stage and an external power source. Such an active alignment method involves finding the position of maximum optical coupling by precisely adjusting the optical fibers not only along the X-Y-Z axes but also about the rotational axis, while keeping the light-emitting or light-receiving elements operational, and sensing in real time the degree of alignment with respect to the optical fibers. This can be costly in terms of working hours, process equipment, process costs, etc. In contrast, a passive alignment assembly of a pick-and-place method does not require separate equipment for operating a light-emitting or light-receiving element, and simply uses predefined position information to assemble parts by using a robot or by looking through a microscope, and as such requires less process time, equipment, costs, etc.

Such a passive optical alignment method entails the problem that it is very difficult to fabricate an optical subassembly in the form of a receptacle with which to freely attach and detach optical fibers. Thus, there is a need for a new structure for an optical subassembly having the form of a receptacle and for a new method of passive optical alignment.

SUMMARY

An objective of the invention is to provide an optical subassembly that is implemented by passive optical alignment.

Another objective of the invention is to provide an optical subassembly in the form of a receptacle that makes it possible to freely attach and detach optical fibers.

Yet another objective of the invention is to provide a passive alignment method for an optical subassembly in which an alignment reference device is used to passively align parts.

However, the problems to be solved by the present invention are not limited to the above and can be found in various embodiments without departing from the spirit and scope of the invention.

DETAILED DESCRIPTION

To resolve the technical problems above, an optical subassembly for passive alignment according to embodiments of the invention is composed of a first lens assembly portion and a second lens assembly portion. The first lens assembly portion comprises a substrate, an alignment, reference device assembled onto the substrate, and an optical element assembled onto the substrate, and a first lens device assembled onto the alignment reference device, while the second lens assembly portion comprises a second lens device and a receptacle.

The alignment reference device is assembled onto the substrate, and the optical element is aligned on the substrate with respect to the alignment reference device assembled onto the substrate. The first lens device comprises a first lens, is assembled onto the alignment reference device such that the first lens is aligned with the optical element aligned on the substrate so as to complete the first lens assembly portion and, by way of the first lens, refracts the light emitted from the optical element to produce parallel light.

The second lens device comprises a second lens, and the second lens device is assembled with the receptacle such that a ferrule alignment hole penetrating the inside of the receptacle is aligned on the same axis with the second lens of the second lens device so as to complete the second lens assembly portion.

The first lens assembly portion and the second lens assembly portion are coupled together with respect to the alignment reference device of the first lens assembly portion, so that the first lens and the second lens are aligned, and the light passing through the first lens is refracted by the second lens for collection.

The ferrule alignment hole of the receptacle extends to the opposite side, to secure an external optical connector by way of the connector insertion hole formed in the opposite side.

That is, the alignment of the optical element, the first lens device, the second lens device, and the receptacle is performed passively with respect to the alignment reference device having a plurality of alignment reference holes.

Thus, an optical subassembly is provided in which the receptacle can be easily modified according to the shape of the optical connector coupled, and which enables easy expansion to uni-directional and bi-directional transmission of multiple channels through modifications to the first lens device, the second lens device and receptacle.

Specific embodiments of the invention will be described below in more detail with reference to the drawings.

Figure 1:
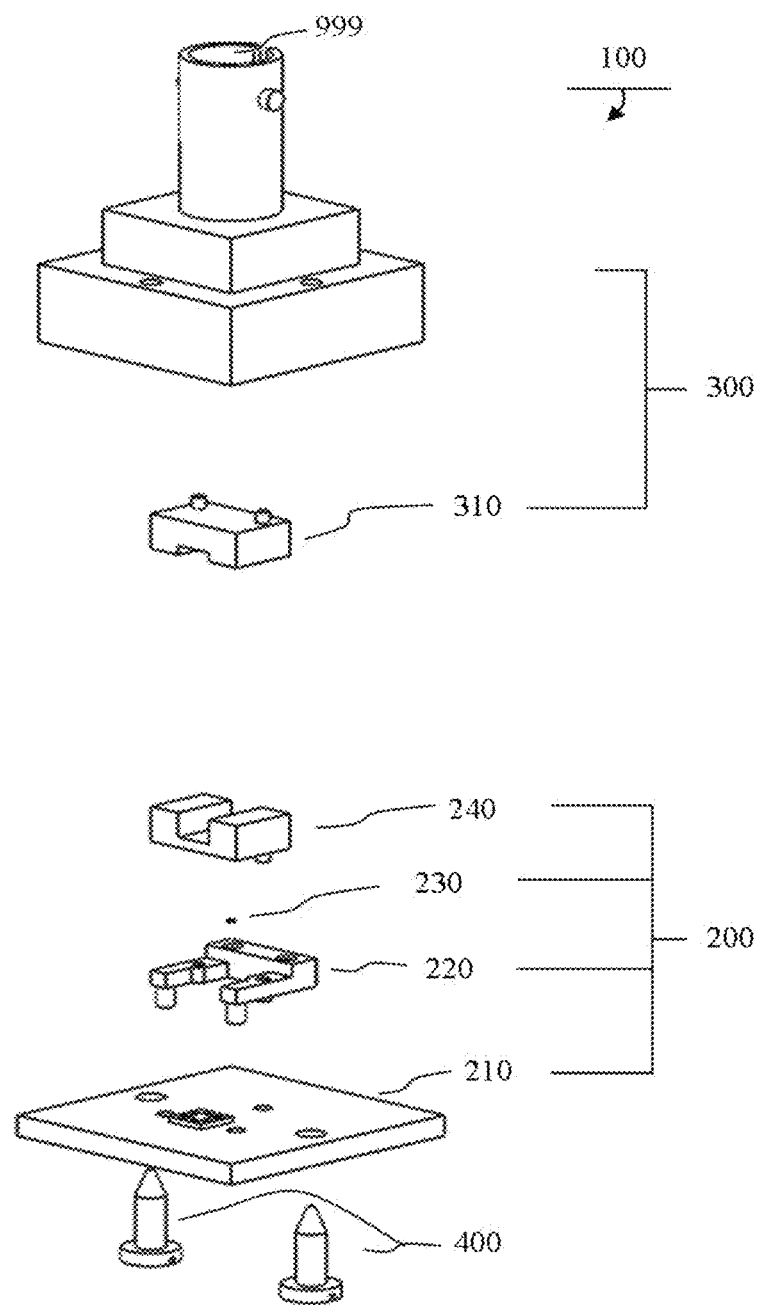
FIG. 1 is an exploded view of the components of an optical subassembly according to an embodiment of the invention.

FIG. 1 is an exploded view of the components of an optical subassembly 100 according to an embodiment of the invention.

Referring to FIG. 1, an optical subassembly 100 according to an embodiment of the invention includes a first lens assembly portion 200, a second lens assembly portion 300, and screws 400. The first lens assembly portion 200 includes a substrate 210, an alignment reference device 220, a light-emitting/receiving element 230, and a first lens device 240. The second lens assembly portion 300 includes a second lens device 310 and an ST-type receptacle 320. The optical subassembly 100 can be formed with coupling of the first lens assembly portion 200 and the second lens assembly portion 300. By way of a connector insertion hole 999 of the receptacle 320 included in the second lens assembly portion 300, an external optical connector can be coupled with the optical subassembly 100.

Here, all of the components included in the optical subassembly 100 can be passively assembled to provide optical alignment. This method of passive assembly will be described below in more detail with reference to FIGS. 2A to 4C.

FIGS. 2A to 2D illustrate a first lens assembly portion during and after passive assembly in a method for passive alignment of an optical subassembly.

Figure 2A:
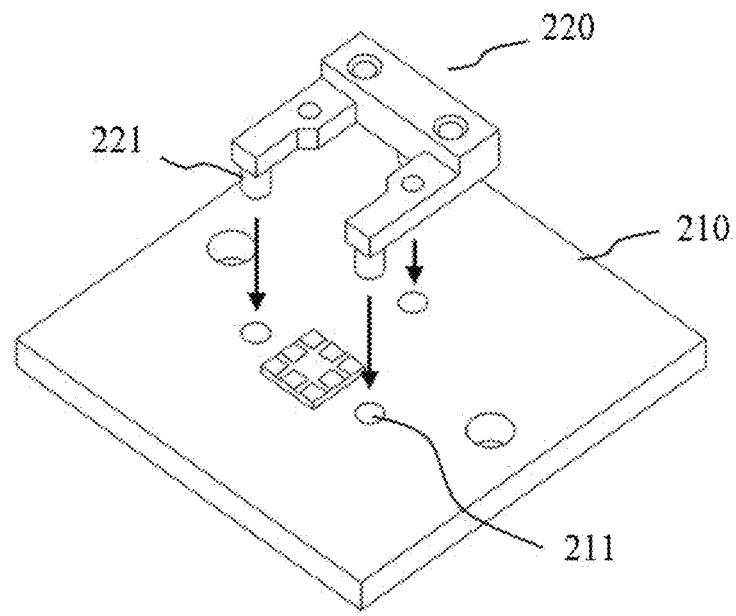
FIG. 2A, FIG. 2B, FIG. 2C, and FIG. 2D illustrate a first lens assembly portion during and after passive assembly in a method for passive alignment of an optical subassembly.
Figure 2B:
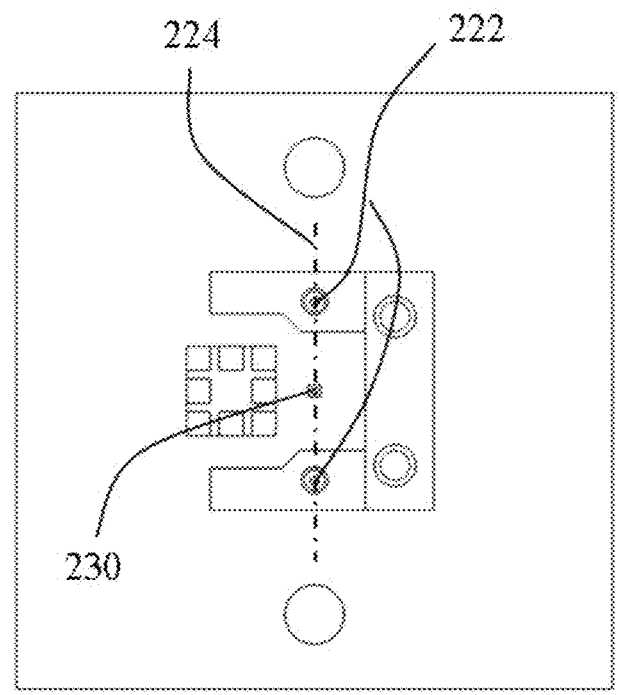
Figure 2C:
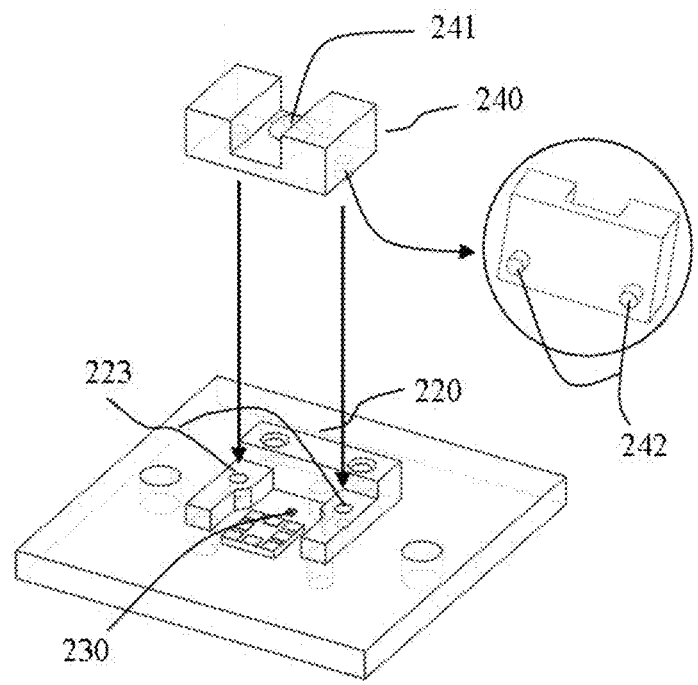
Figure 2D:
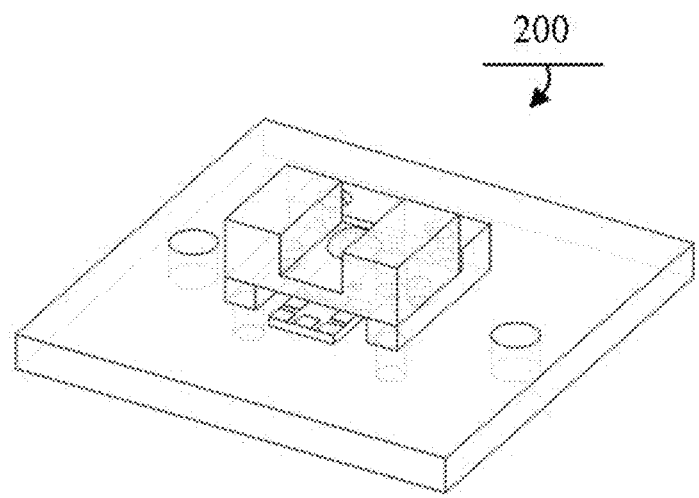

Referring to FIGS. 2A to 2D, securing pillars 221 of the alignment reference device 220 and substrate holes 211 of the substrate 210 can be coupled together, to secure the alignment reference device 220 onto the substrate 210 (FIG. 2A). Next, the light-emitting/receiving element 230 can be aligned with respect to a center line 224 connecting alignment reference holes 222 of the alignment reference device 220 (FIG. 2B). Next, two alignment holes 223 of the alignment reference device 220 and two alignment pillars 242 of the first lens device 240 can be coupled together to secure the first lens device 240 (FIG. 2C), and a first lens 241 and the light-emitting/receiving element 230 can be optically aligned, thereby forming the first lens assembly portion 200 (FIG. 2D).

Figure 3A:
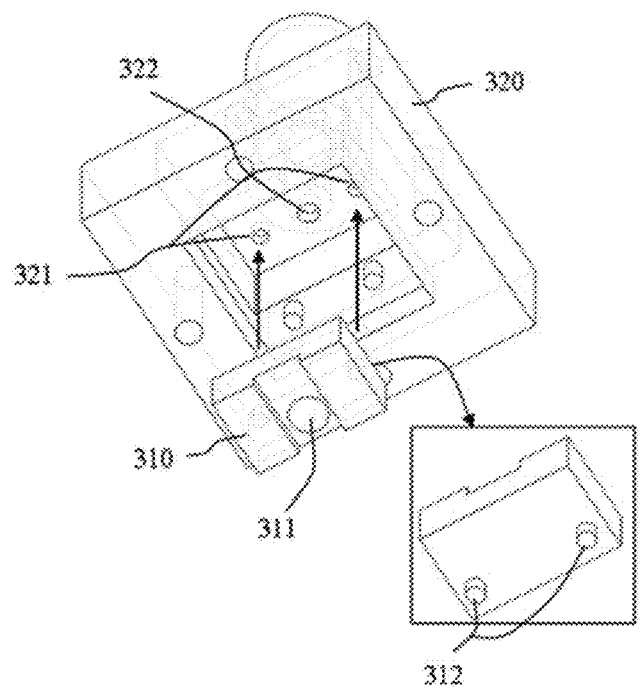
FIG. 3A and FIG. 3B illustrate a second lens assembly portion during and after passive assembly in a method for passive alignment of an optical subassembly.
Figure 3B:
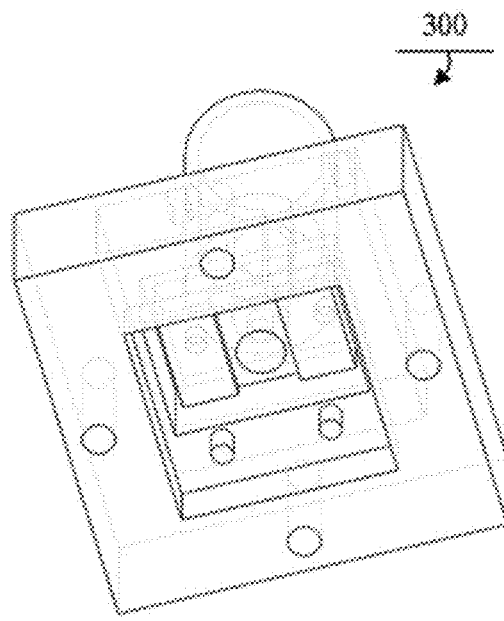

FIGS. 3A and 3B illustrate a second lens assembly portion during and after passive assembly in a method for passive alignment of an optical subassembly.

Referring to FIGS. 3A and 3B, two alignment pillars 312 of the second lens device 310 and two alignment holes 321 of the receptacle 320 can be coupled together to secure the second lens device 310, and the center of a second lens 311 and the center of a ferrule alignment hole 322 can be aligned, thereby forming the second lens assembly portion 300.

Figure 4A:
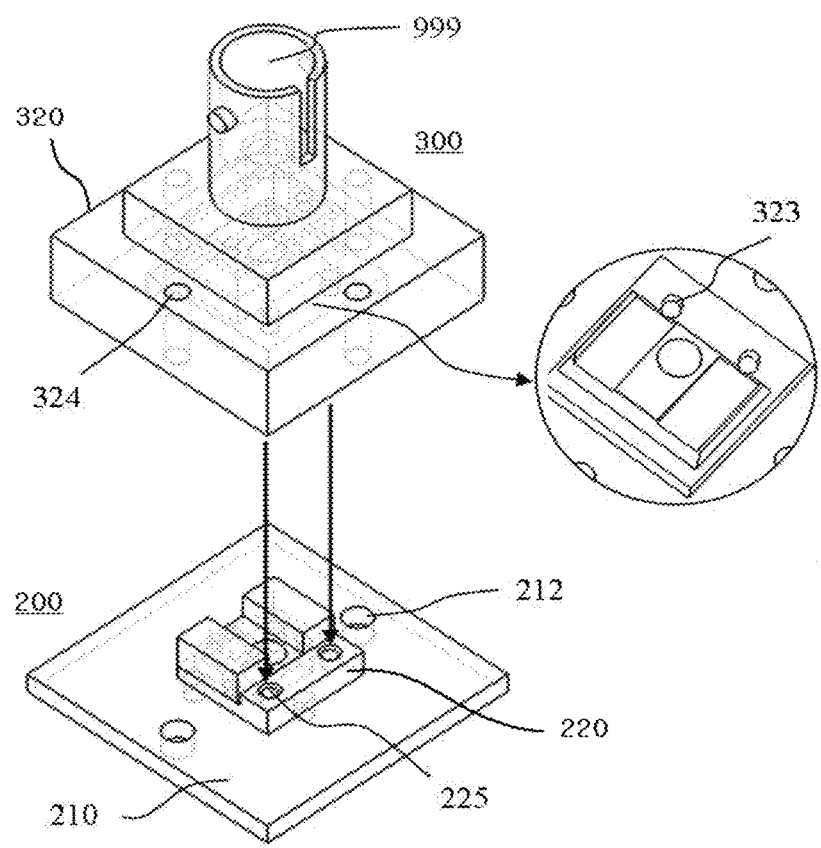
FIG. 4A illustrates the passive coupling and securing of the first lens assembly portion and the second lens assembly portion.
Figure 4B:
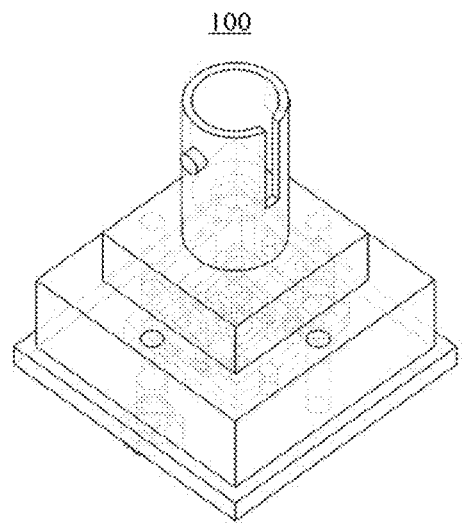
FIG. 4B illustrates the first lens assembly portion and the second lens assembly portion after the passive coupling and securing.
Figure 4C:
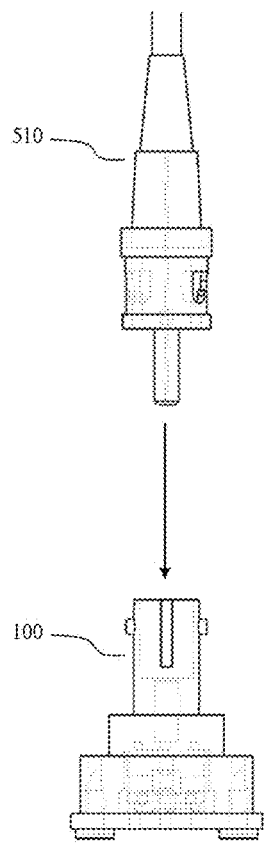
FIG. 4C illustrates the coupling of an optical connector, in a method for passive alignment of an optical subassembly.

FIG. 4A illustrates the passive coupling and securing of the first lens assembly portion and the second lens assembly portion, FIG. 4B illustrates the first lens assembly portion and the second lens assembly portion after the passive coupling and securing, and FIG. 4C illustrates the coupling of an optical connector, in a method for passive alignment of an optical subassembly.

Referring to FIGS. 4A to 4C, the two alignment reference holes 225 of the alignment reference device 220 in the first lens assembly portion 200 can be coupled with the two alignment pillars 323 of the receptacle 320 in the second lens assembly portion 300, so as to couple the first lens assembly portion 200 with the second lens assembly portion 300. As a result, the light-emitting/receiving element 230, first lens 241, second lens 311, and ferrule alignment hole 322 can be passively aligned (FIG. 4A). Next, the substrate holes 212 of the substrate 210 and the screw fastening holes 324 of the receptacle 320 can be connected and secured, to complete the optical subassembly 100 (FIG. 4B). Finally, an ST optical connector 510 can be coupled to the connector insertion hole 999 of the receptacle 320 of the optical subassembly 100 to align the light-emitting/receiving element 230 with the optical connector ferrule 511 (FIG. 4C). Thus, in an optical subassembly 100 for passive alignment according to embodiments of the invention, the light-emitting/receiving element 230, first lens device 240, second lens device 310, and receptacle 320 can be passively aligned with respect to the alignment reference holes 222. As a result, the optical subassembly 100 for passive alignment can be assembled in a simple structure, and since it is based on collimated optics formed by two lenses included in separated portions, the optical alignment can be performed in a flexible manner. Also, according to embodiments of the invention, the optical subassembly can be fabricated in the form of a receptacle by which to freely attach and detach an optical fiber while performing passive optical alignment. A description will be provided below, with reference to FIG. 5, of an example of operating an optical subassembly 100 for passive alignment formed by the procedures described above.

Figure 5:
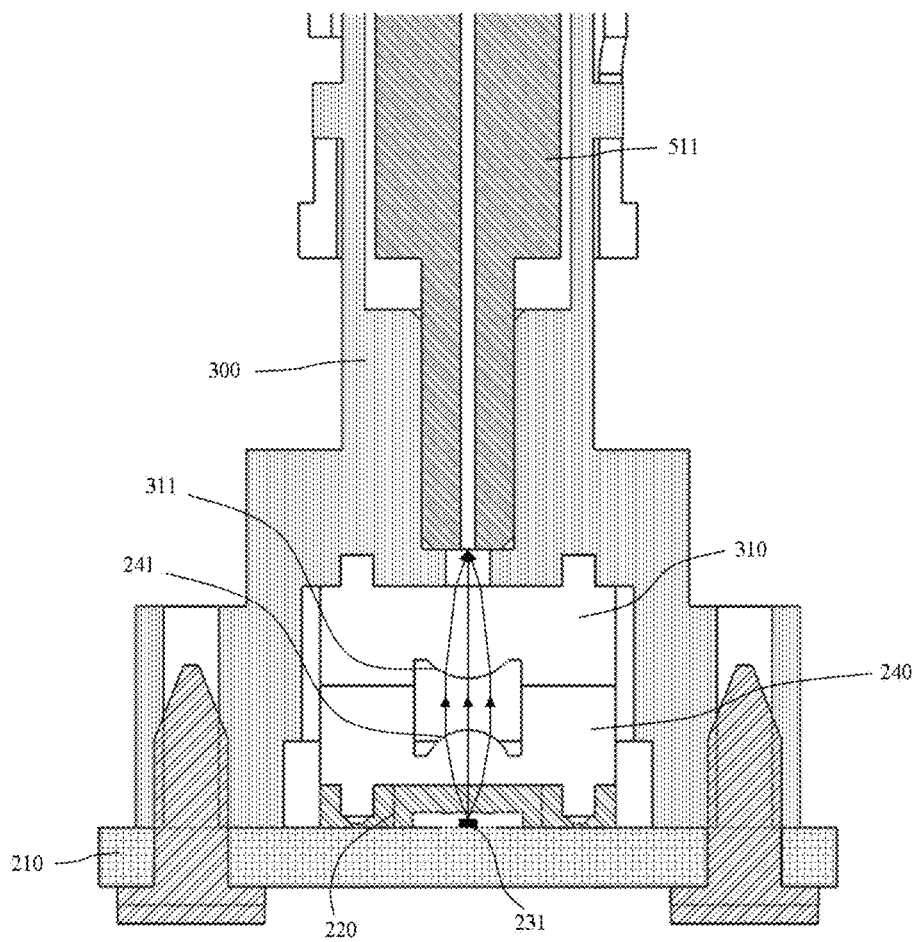
FIG. 5 is a cross-sectional view illustrating the light path of an optical transmitter in an optical subassembly.

FIG. 5 is a cross-sectional view illustrating the light path of an optical transmitter in an optical subassembly.

Referring to FIG. 5, a beam emitted from a light-emitting element 231 passes through the first lens 241 of the first lens device 240 to be parallelized (i.e., collimated) and is collected by the second lens 311 of the second lens device 310 to be inputted to the optical connector ferrule 511. A light-receiving part can be implemented with the same structure, but with a light-receiving element positioned instead of the light-emitting element 231, and by the same principle as for the optical transmitter, a beam emitted from the optical connector ferrule 511 can be collected by the light-receiving element.

Figure 6:
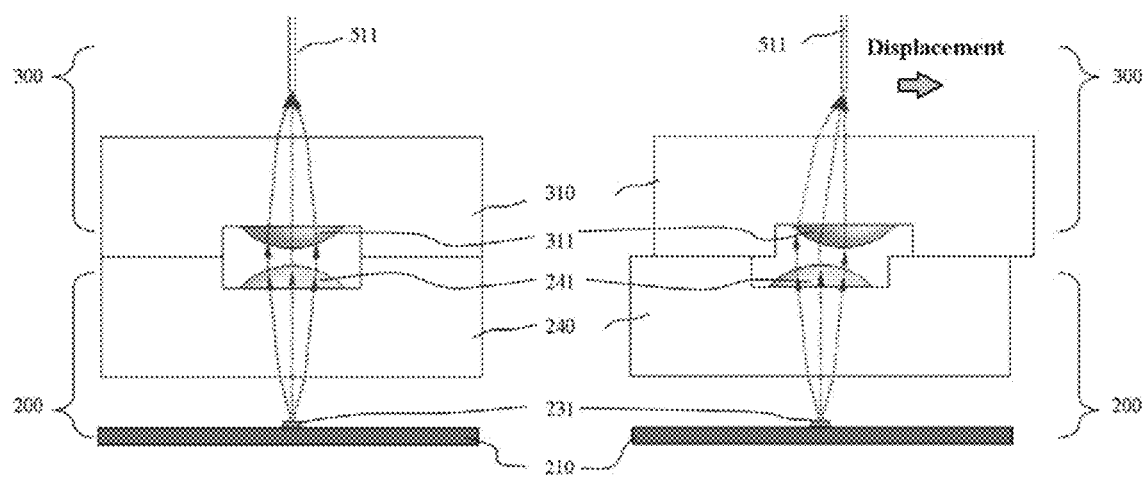
FIG. 6 illustrates the advantages of collimated optics in an optical subassembly using an optical transmitter as an example.

FIG. 6 illustrates the advantages of collimated optics in an optical subassembly, using an optical transmitter as an example. FIG. 6 illustrates how optical alignment is performed depending on the arrangement of the first lens device 240 and the second lens device 310 in the optical transmitter of FIG. 5.

Referring to FIG. 6, the drawing on the left illustrates the case in which the first lens, device 240 and the second lens device 310 are perfectly aligned in a straight line, while the drawing on the right illustrates the case in which the first lens device 240 and the second lens device 310 are displaced with respect to each other.

As shown in the drawings, the first lens assembly portion 200 and the second lens assembly portion 300 may be loosely coupled, e.g., by a displacement, so that the effect of coupling the optical connector ferrule 511 as it is fastened to the second lens assembly portion 300 is not transferred directly to the first lens assembly portion 200. As a result, even when there is a displacement between the first lens assembly portion 200 and the second lens assembly portion 300, the first lens 241 and the second lens 311 can maintain collimated optics, so that the tolerance in the displacement between the first lens assembly portion 200 and second lens assembly portion 300 may not affect the optical alignment between the light-emitting element 231 and the optical connector ferrule 511. By the same principle, a flexible optical coupling can be obtained in an optical receiver between the optical connector ferrule 511 and the light-receiving element.

A description will be provided below, with reference to FIGS. 7A to 11, of various applications of the optical subassembly 100 for passive alignment according to embodiments of the invention.

Figure 7A:
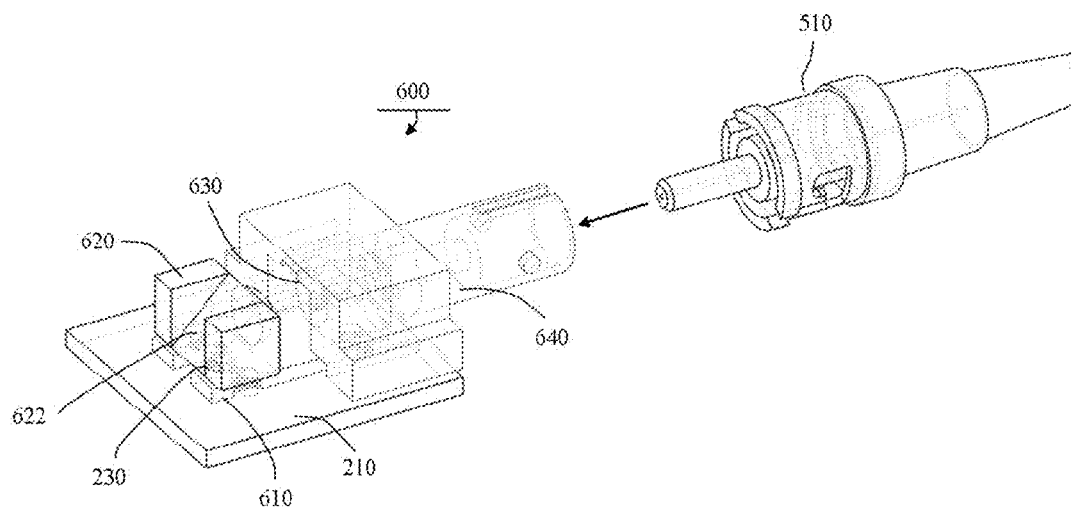
FIG. 7A illustrates an optical subassembly oriented horizontally using a prism according to an embodiment of the invention.

FIG. 7A illustrates an optical subassembly oriented horizontally using a prism according to an embodiment of the invention. The descriptions above were provided for embodiments of the optical subassembly in which the optical connector was coupled in a vertical direction with respect to the optical subassembly. In the following, a description will be provided, with reference to FIGS. 7A and 7B, of embodiments of an optical subassembly in which the optical connector is coupled in a horizontal direction with respect to the optical subassembly.

In FIG. 7A, an alignment reference device 610, a light-emitting/receiving element 230, a first lens device 620 including a prism 622, a second lens device 630, and a horizontal receptacle 640 can be passively assembled to complete a horizontal optical subassembly 600. The horizontal optical subassembly 600 can be coupled with an ST optical connector 510 for use.

Figure 7B:
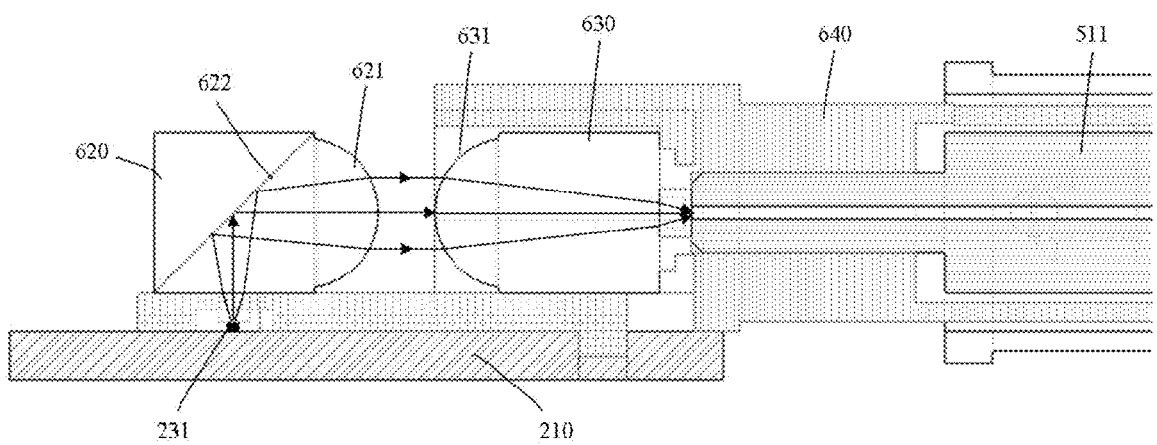
FIG. 7B illustrates the light path of an optical transmitter in the horizontally oriented optical subassembly using a prism of FIG. 7A.

FIG. 7B illustrates the light path of an optical transmitter in the horizontally oriented optical subassembly using a prism of FIG. 7A.

Referring to FIG. 7B, light emitted in a vertical direction from the light-emitting element 231 is reflected by the prism 622 of the first lens device 620 and is made to proceed in a horizontal direction, is transformed into a collimated (i.e., parallel) beam by a first lens 621 of the first lens device 620, and is collected by a second lens 631 of the second lens device 630, to be inputted to the ST optical connector ferrule 511 coupled to the horizontal receptacle 640. In the case of an optical receiver, a light-receiving element is aligned at the position of the light-emitting element 231, and following the same light path as in the transmitter part, the light emitted from the optical connector ferrule 511 is collected at the light-receiving element.

Figure 8A:
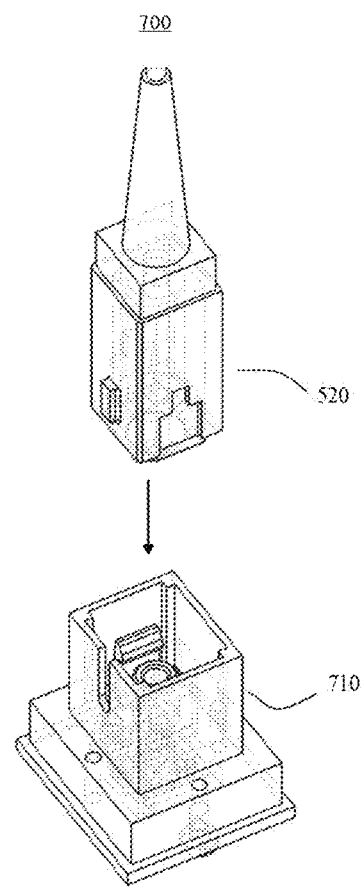
FIG. 8A and FIG. 8B illustrate optical subassemblies having various receptacle types according to an embodiment of the invention.
Figure 8B:
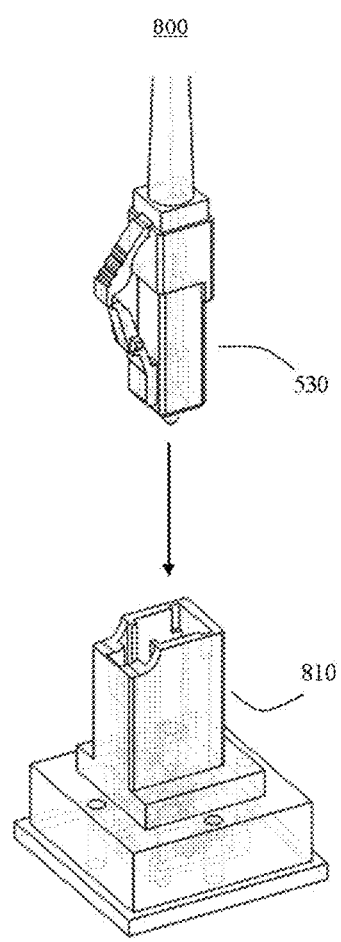

FIGS. 8A and 8B illustrate optical subassemblies having various receptacle types according to an embodiment of the invention.

As illustrated in FIG. 8A, an SC-type receptacle 710 can be passively coupled with an SC optical connector 520 to form an optical subassembly 700. Also, as illustrated in FIG. 8B, an LC-type receptacle 810 can be passively coupled with an LC optical connector 530 to form an optical subassembly 800. In general, LC-type optical connectors and receptacles provide the advantages of having small volumes, meeting industrial standards, and having separator clips which can be applied not only to simplex connectors but also to duplex connectors. In recent times, miniature-sized connectors (e.g. LC connectors) and multi-fiber connectors (e.g. MTP connectors) are mainly used in applications related to data communication and electrical communication, as these can handle larger numbers of optical fibers per unit of rack space. However, these receptacle types are merely mentioned as examples, and the types of receptacles are not limited to the above.

Figure 9A:
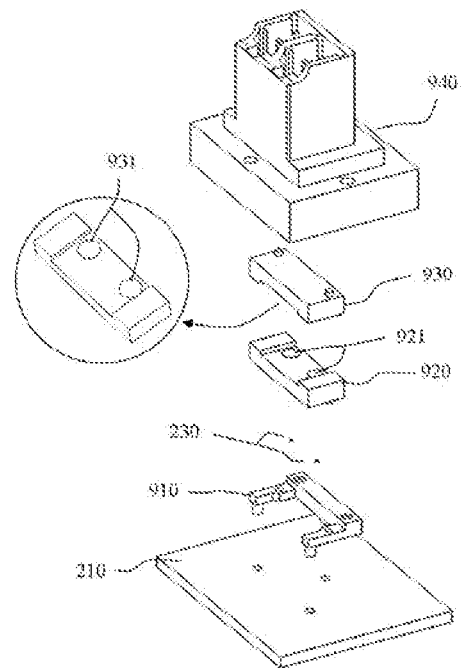
FIG. 9A and FIG. 9B illustrate a dual-channel optical assembly according to another embodiment of the invention.
Figure 9B:
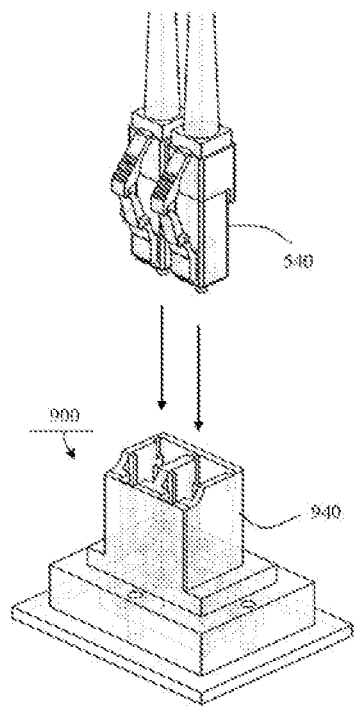

FIGS. 9A and 9B illustrate a dual-channel optical assembly according to another embodiment of the invention.

Referring to FIGS. 9A and 9B, it is possible, depending on the embodiment, to horizontally extend the length of an alignment reference device 910, use two lenses each for a first lens 921 of a first lens device 920 and a second lens 931 of a second lens device 930, and change the shape of the receptacle into that of a duplex receptacle 940. Consequently, each of the components can be passively assembled to implement a dual-channel optical subassembly 900. Also, a duplex type optical connector 540 can be coupled to form an optical coupling of two channels.

While FIGS. 9A and 9B illustrate an example of expanding to two channels, the optical subassembly can easily be implemented expanded to two or more channels, by expanding and modifying the length of the alignment reference device, the number of lenses included in the first lens device 920, the number of lenses included in the second lens device 930, and/or the shape of the receptacle 940.

Figure 10:
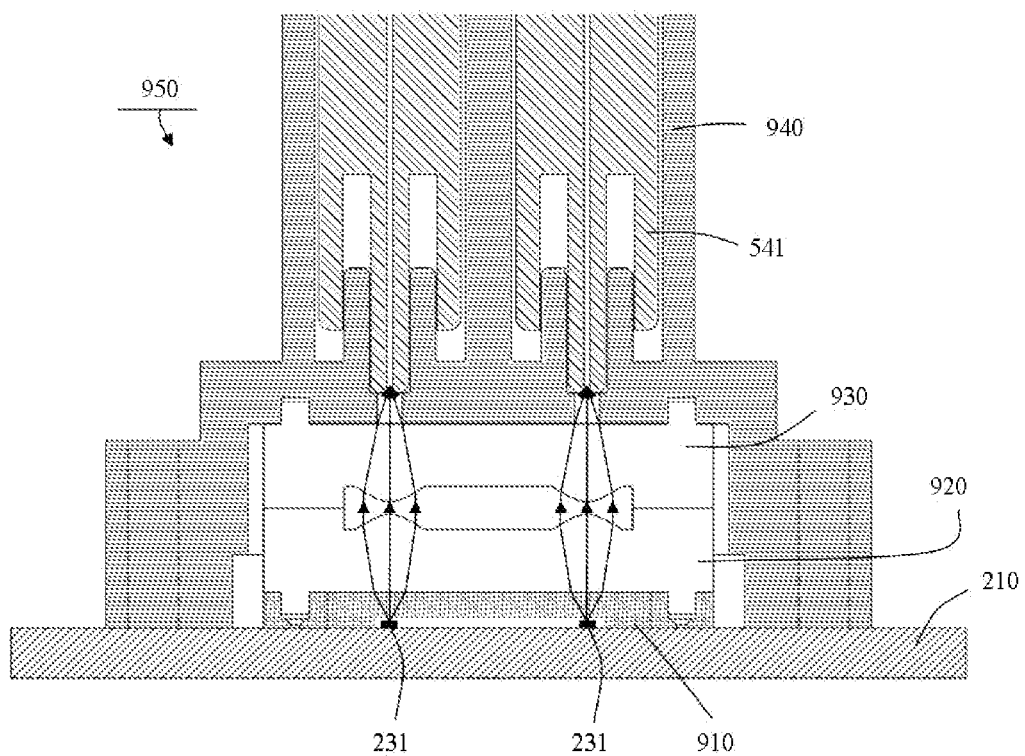
FIG. 10 illustrates the light paths in an optical transmitter of the dual-channel optical subassembly of FIG. 9B.

FIG. 10 illustrates the light paths in an optical transmitter of the dual-channel optical subassembly of FIG. 9B.

Referring to FIG. 10, by aligning two light-emitting elements 231 with the first lens device 920 including two lenses and the second lens device 930 including two lenses, it is possible to form a dual-channel optical transmitter. Depending on the embodiment, it is also possible to substitute the two light-emitting elements with two light-receiving elements to form a dual-channel optical receiver 950.

Figure 11:
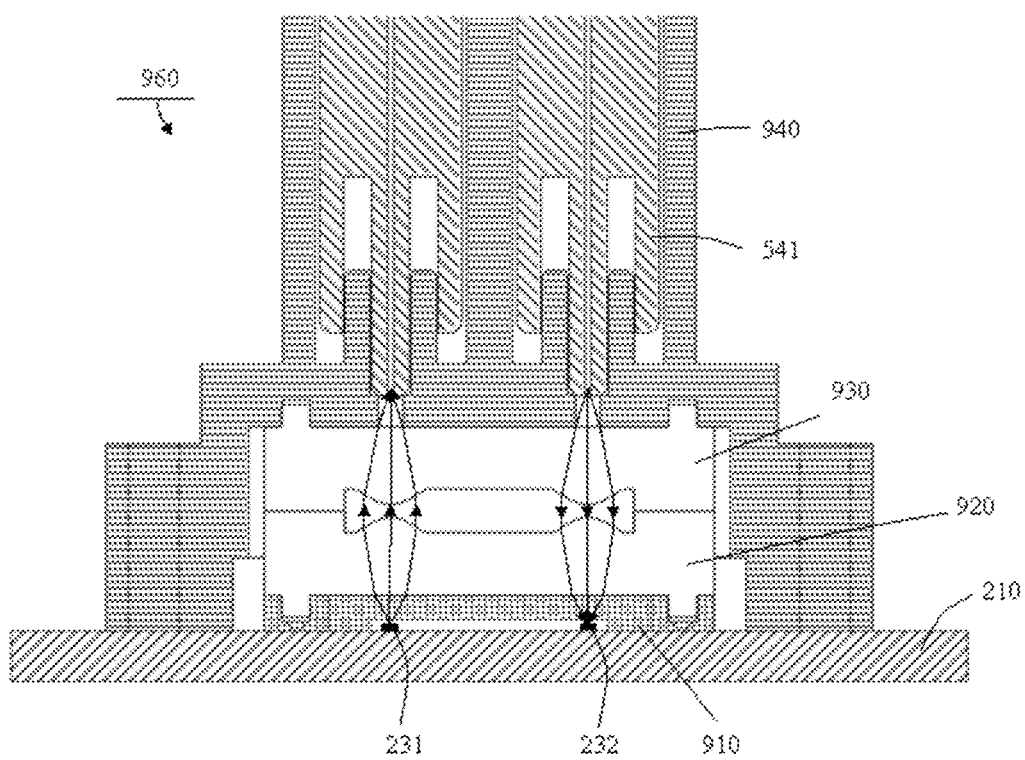
FIG. 11 illustrates the light paths in an optical transceiver of the dual-channel optical subassembly of FIG. 9B.

FIG. 11 illustrates the light paths in an optical transceiver of the dual-channel optical subassembly of FIG. 9B.

Referring to FIG. 11, by aligning one light-emitting element 231 and one light-receiving element 232 with the first lens device 920 including two lenses and the second lens device 930 including two lenses, it is possible to form an optical transceiver 960 that allows bi-directional transmission.

All major parts included in the optical subassembly 100 of the present invention described above can be fabricated by injection molding, to provide high precision and be suitable for mass production. Among the parts included, the first lens device 240 and second lens device 310 are made by applying injection molding to a transparent material, as these parts must transmit light.

Figure 12:
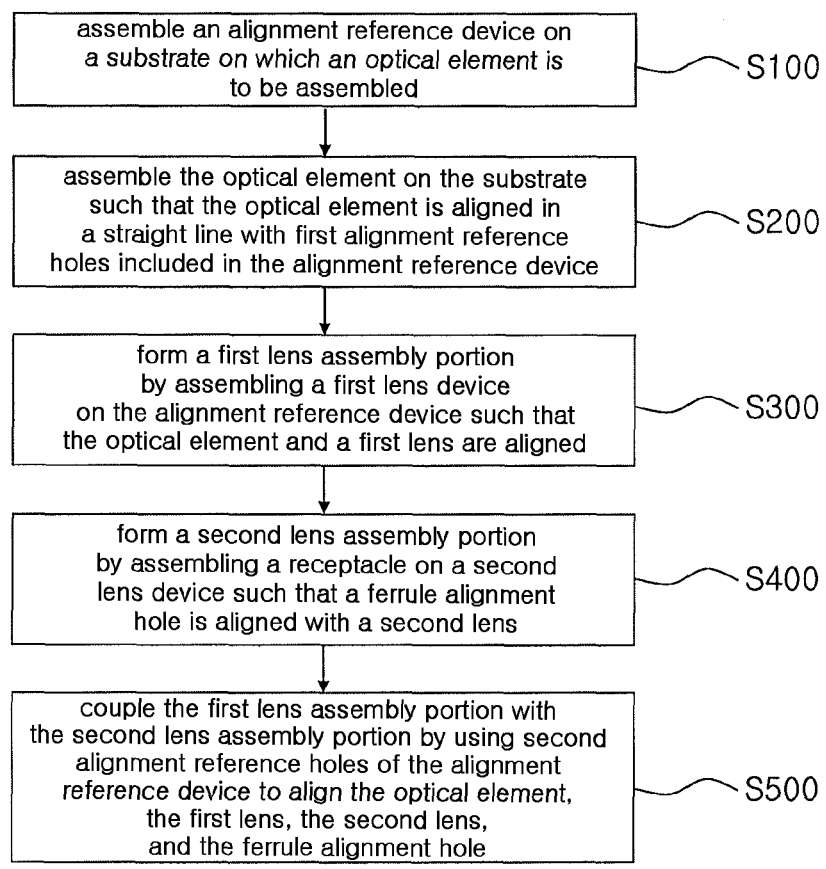
FIG. 12 is a flowchart illustrating a method for passive alignment of an optical subassembly according to an embodiment of the invention.

FIG. 12 is a flowchart illustrating a method for passive alignment of an optical subassembly according to an embodiment of the invention.

Referring to FIG. 12, an alignment reference device is assembled on a substrate on which an optical element is to be assembled (S100). Then, the optical element is assembled on the substrate such that the optical element is aligned in a straight line with a plurality of first alignment reference holes included in the alignment reference device (S200). Next, a first lens assembly portion is formed, by assembling a first lens device, which includes a first lens, on the alignment reference device such that the optical element and the first lens are aligned (S300). Also, a second lens assembly portion is formed, by assembling a receptacle on a second lens device, which includes a second lens, such that a ferrule alignment hole penetrating through the receptacle is aligned with the second lens (S400). Finally, the first lens assembly portion and the second lens assembly portion are coupled together by using a plurality of second alignment reference holes included in the alignment reference device such that the first lens is aligned with the second lens (S500). Thus, according to a method for passive alignment of an optical subassembly, the parts forming the optical subassembly can be passively aligned by using an alignment reference device.

An optical subassembly according to embodiments of the invention offers a simple assembly method, since all parts are passively assembled to provide optical alignment, and enables greater flexibility in optical alignment, since it is based on collimated optics provided by two lenses included in separated portions. Furthermore, an optical transmitter and an optical receiver can be formed with the same structure, and the light path can be altered freely along the vertical direction or horizontal direction by modifying the shape of the first lens device. Embodiments of the invention allow easy coupling to various types of optical connectors and easy expansion to structures for uni-directional or bi-directional signal transmission over multiple channels. Moreover, since all major parts of the optical subassembly can be fabricated by plastic injection molding, it provides high precision and is suitable for mass production.

While the technical spirit of the invention is described above with reference to the accompanying drawings, the preferred embodiments of the invention described above are presented merely as examples and are not intended to limit the invention. It is to be appreciated that a person having ordinary skill in the art to which the invention pertains can conceive numerous variations and imitations without departing from the spirit and scope of the invention.

The invention claimed is:

1. An optical subassembly for passive alignment, comprising:
   a substrate;
   an alignment reference device having a plurality of first alignment reference coupling elements and being assembled on the substrate;
   an optical element placed on the substrate and aligned with the plurality of first alignment reference coupling elements;
   a first lens device including a first lens and a plurality of first corresponding alignment coupling elements that are positioned on a straight line with the first lens and being assembled on the alignment reference device by coupling the plurality of first alignment coupling elements with the plurality of first corresponding alignment reference coupling elements such that the first lens is aligned with the optical element, wherein the first lens parallelizes light emitted from the optical element;
   a second lens device including a second lens and a plurality of second alignment coupling elements that are positioned on a straight line with the second lens, wherein the second lens collects the light from the first lens; and
   a receptacle having a ferrule alignment hole penetrating the receptacle, wherein a side of the receptacle is assembled on the second lens device by coupling the plurality of second alignment coupling elements with a plurality of second corresponding alignment reference coupling elements formed in the receptacle such that the ferrule alignment hole is aligned with the second lens and the receptacle is assembled on the alignment reference device such that the second lens is aligned with the first lens, and wherein the ferrule alignment hole extends to a connector insertion hole formed on an opposite side of the receptacle and the connector insertion hole secures an external optical connector, and wherein the optical element, the first lens device, the second lens device and the receptacle are passively aligned with respect to the plurality of first alignment reference coupling elements.

2. The optical subassembly of claim 1, wherein the optical element is a light-emitting element.

3. The optical subassembly of claim 1, wherein the optical element is a light-receiving element.

4. The optical subassembly of claim 1, wherein the optical subassembly is implemented as an optical transceiver capable of bi-directional optical transmission by having a light-emitting element and a light-receiving element as the optical element.

5. The optical subassembly of claim 1, wherein the alignment reference device has two first alignment reference coupling elements, and the optical element is aligned with the two first alignment reference coupling elements in a straight line.

6. The optical subassembly of claim 5, wherein the alignment reference device has two receptacle alignment reference elements formed in locations different from those of the two first alignment reference coupling elements and the receptacle has two complementary receptacle alignment reference elements formed in locations different from those of the plurality of second corresponding alignment reference coupling elements, and wherein the receptacle is assembled on the alignment reference device by coupling the two receptacle alignment reference elements with the two complementary receptacle alignment reference elements such that the second lens device is passively aligned with the first lens device.

7. The optical subassembly of claim 1, wherein the substrate, the optical element, the alignment reference device, and the first lens device are passively assembled to form a first lens assembly portion, and the second lens device and the receptacle are passively assembled to form a second lens assembly portion.

8. The optical subassembly of claim 7, wherein the first lens assembly portion and the second lens assembly portion are loosely coupled based on collimated optics such that the coupling tolerance is relatively high.

9. The optical subassembly of claim 1, wherein the first lens device further comprises a prism and forms a light path in a horizontal direction and/or a vertical direction by using the prism.

10. The optical subassembly of claim 1, wherein the optical subassembly is coupled with one of ST, SC, LC, and FC optical connectors according to a shape of the receptacle.

11. A method for passive alignment of an optical subassembly, comprising:
   assembling an alignment reference device on a substrate;
   placing an optical element on the substrate to be aligned with a plurality of first alignment reference coupling elements formed in the alignment reference device;
   forming a first lens assembly portion by assembling an alignment reference device having a plurality of first alignment reference coupling elements and a first lens device including a first lens on the substrate such that the first lens is aligned with the optical element, wherein a plurality of first corresponding alignment coupling elements formed on a straight line with the first lens in the first lens device are coupled with the plurality of first alignment reference coupling elements;

forming a second lens assembly portion by assembling a receptacle on a second lens device including a second lens such that the second lens is aligned with a ferrule alignment hole penetrating the receptacle, wherein a plurality of second alignment coupling elements formed on a straight line with the second lens in the second lens device are coupled with a plurality of second corresponding alignment reference elements formed on the receptacle; and coupling the first lens assembly portion with the second lens assembly portion using a plurality of receptacle alignment reference elements formed in the alignment reference device to couple with a plurality of complementary receptacle alignment reference elements formed in the receptacle such that the first lens is aligned with the second lens.

12. The method of claim 11, wherein the optical element is one of a light-emitting element and a light-receiving element.

13. The method of claim 11, wherein the first lens assembly portion and the second lens assembly portion are loosely coupled based on collimated optics such that the coupling tolerance is relatively high.

* * * * *